Jan. 25, 1966  F. FRANZ  3,230,785
METRONOME
Filed March 19, 1964

INVENTOR.
Frederick Franz
BY Roy L. Parsell
ATTORNEY.

3,230,785
METRONOME
Frederick Franz, 2 Woodruff St., West Haven, Conn.
Filed Mar. 19, 1964, Ser. No. 353,135
6 Claims. (Cl. 74—198)

This invention relates to tempo indicating devices and more particularly to a metronome a preferred type of which is illustrated in U.S. Patent 2,150,967, issued March 21, 1939, to Frederick Franz. In devices of this character precise adjustment for accurate regulation is a basic essential.

It is therefore the primary object of this invention to provide means for adjusting the mechanism thereof to effect the necessary precise control. Another object of this invention is to provide micro adjusting means.

In order to construct a metronome at a low cost certain component parts are manufactured on a quantity basis as for example, by molding from synthetic resins or machining on automatic machines. In addition to wear on the molds and tools, the general run of component parts, as manufactured on a production basis, have variations or manufacturing tolerances which affect certain critical dimensions. Hence, the design of the component parts must be made for compensation of such variations to maintain the desired accuracy of this metronome. Therefore, another object of this invention is to provide adjusting means which is simple, convenient and accurate.

Other objects and a fuller understanding of this invention may be had by referring to the following description and claims, taken in conjunction with the accompanying drawings in which:

Figures 1, 2, 3, 4:
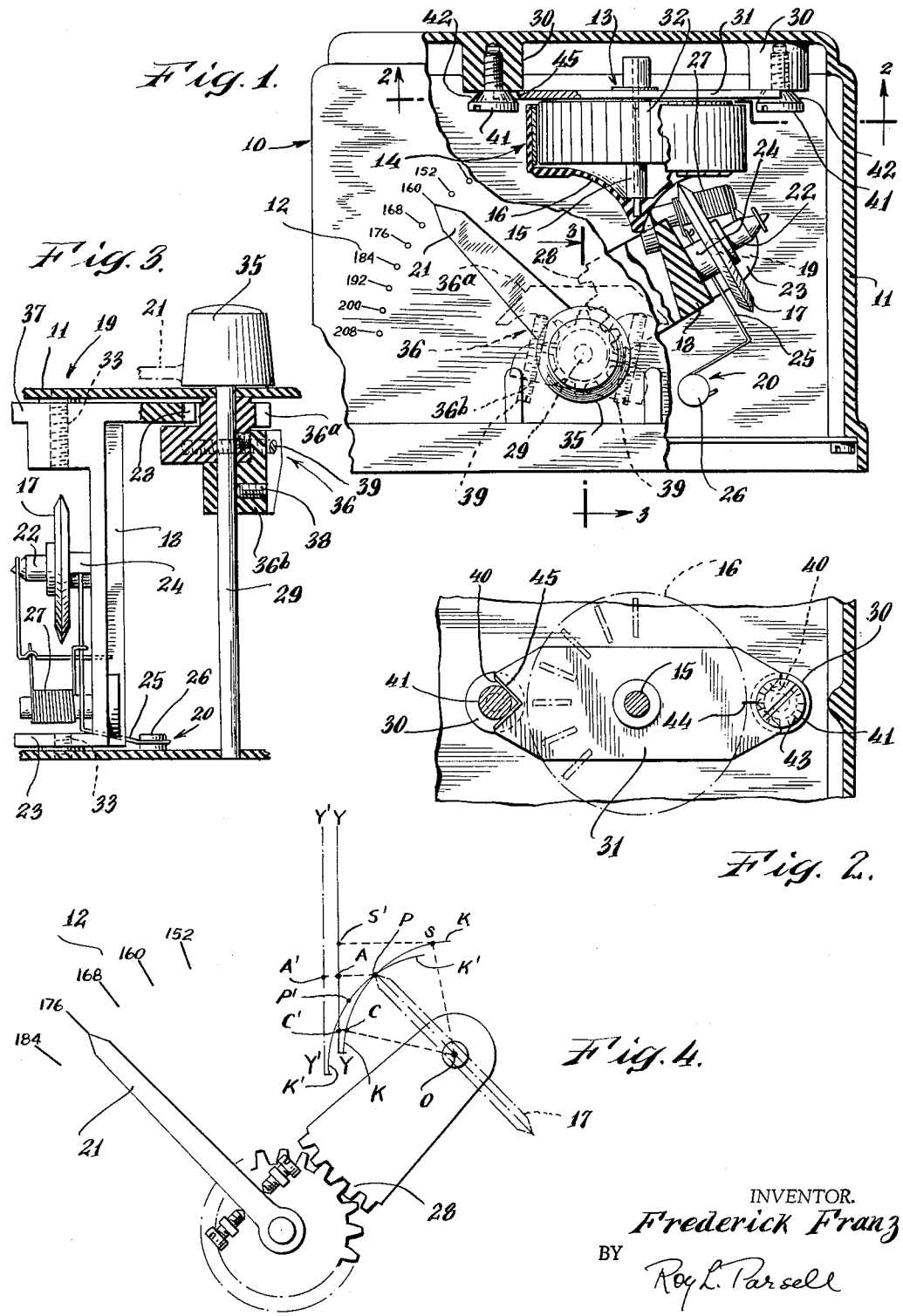
FIGURE 1 is a partially sectioned front elevational view generally illustrating the invention.
FIGURE 2 is a sectional view taken on the horizontal line 2—2 of FIGURE 1.
FIGURE 3 is a sectional view taken on line 3—3 of FIGURE 1 and turned 90° counter clockwise as viewed in the drawing.
FIGURE 4 is a schematic diagram illustrating the functioning of this invention.

Referring to the drawing, numeral 10 denotes generally the metronome unit having a case 11 and provided with an indexing scale 12 engraved thereon. A motor unit 13 depends from the top of the case 11 and contains a constant speed rotor 14 mounted on a shaft 15 which shaft and rotor 14 are free to move vertically to a limited extent for the purpose of maintaining continuous driving engagement with a driven member subsequently explained. The lower portion of rotor 14 is provided with modified conical driving surface 16. A disk like driven member 17 is mounted on shaft 22 and journaled in a cradle 18 which rocks on an axis 19 to enable the periphery of the driven disk 17 to traverse the driving surface 16 to vary the speed of the disk 17. The disk 17 actuates a hammer 20 which strikes this inside wall of the case 11 to produce an audible signal of a frequency proportional to the r.p.m. of the disk shaft 22.

An indexing pointer 21 is connected with the cradle 18 so that the latter may be positioned to correspond with a desired scale graduation by setting of the pointer on the scale, and thusly the disk 17 will rotate at the r.p.m. corresponding to the indicated signal frequency on the scale 12.

Before describing the remaining details of the structure of my invention the essentials of the variable speed drive together with the improvements in corrective adjustments of my invention will first be described for a clear understanding of the functioning of structural details.

Referring now to FIGURE 4, the curved line KK represents an extended arc of the driving surface over which the point of driving engagement of the periphery of the driven member traverses.

The line OC denotes a position of relatively low speed and the line OS that of relatively high speed of the driven disk as will be obvious from the surface speeds of points C and S due to their respective radii CC' and SS' on the axis YY of the driving cone. It will be noted further that as the point P on the periphery of the disk traverses the arc KK in a clockwise direction that the radius of the point of engagement increases more rapidly as the point P is traversed on arc KK.

To further illustrate the effect of my improvement, suppose that the axis of this rotor 14 occupies a position relative to the cradle axis 19 corresponding to axis Y'Y' due to the combination of manufacturing tolerances affecting certain critical dimensions.

Since the rotor is free to move vertically and the cradle is held in a fixed position by the index pointer registering with the desired frequency graduation, the rotor drops vertically under its weight to maintain driving engagement and the new position of the driving surface 16 is now denoted by arc K'K' and the point of driving engagement P will now be at a different place on the arc KK which has now assumed the position denoted by K'K' and old point P now becomes P'.

The old radius AP of point P has increased to A'P by an amount A'A that axis Y'Y' is incorrectly located from correct axis position YY. The result is obviously higher speed of new point P which is incorrect for the scale setting.

It is also thus demonstrated that the spacing of graduations from a fixed reference point on scale 12 must correspond in relative proportions to surface speed points on arc KK also spaced from a fixed reference point on the driving surface, that is, the arc KK. Should the axis of the rotor be shifted from the foregoing described position, a new arc of driving engagement would be in effect with corresponding points of different surface speeds.

The details of the structure to accomplish the foregoing functions will now be described.

The case 11 is preferably molded from a synthetic resin incorporating the scale 12 and depending bosses 30 for mounting the motor unit 13.

A cradle 18 is rotatively journaled on short lengths of shafts 33 mounted in opposite side walls of case 11 as clearly shown in FIGURE 3. Also, as clearly shown in FIGURE 3 the driven member 17 in the form of disk beveled at its periphery is mounted on a shaft 22 which is journaled in the bottom span of cradle 18. Shaft 22 is provided with a cam 24 for engaging a hammer arm 25 on one end of which is fixed a hammer head 26 which strikes the wall of case 11 under the urge of a hammer spring 27 when actuated by cam 24.

To insure efficient driving contact between driving surface 16 of the rotor 14, preferably molded from a synthetic resin and the driven member 17 I prefer to form the latter in the shape of a disk beveled at its periphery as clearly shown in FIGURE 1. I prefer to make this disk 17 of a resilient nature as for example a rubber composition to act on the molded driving surface 16 of the rotor 14. In the preferred construction I control the pressure at the point of driving engagement by mounting the rotor 14 on the vertical shaft 15 so that the rotor will have vertical movement to bear against the disk 17. However, in other forms of construction I may create this bearing pressure by means of a spring so mounted as to bias the rotor against the disk. I may also position the rotor relative to the motor field so that the axial component of the magnetic flux will furnish the necessary force.

An indexing shaft 29 (see FIGURE 3) is journaled in case 11 one end of which is mounted a finger knob 35 and the pointer 21.

A coupling member 36 comprising a first portion 36a is rotatively mounted on shaft 29 and provided with a section of gear teeth to engage a corresponding section of gear teeth on cradle extention member 37. A companion second section 36b of the coupling member 36 is mounted on shaft 29 and fixed thereto by a set screw 38. A pair of coupling adjusting screws 39 connect the two portions 36a and 36b and by relative rotation of these adjusting screws 36a and 36b the two portions of the coupling may be rocked on each other in opposite directions to move the pointer 21 relative to the cradle for adjusting the position of the cradle to correspond to the desired scale reading.

Motor unit 13 comprises a rotor 14 having a shaft 15 which is journaled in bracket 31. Rotor 14 which surrounds motor electrical field 32, the latter being fixed to bracket 31 is provided with an external concave conical driving surface 16.

In order to shift the position of the rotor shaft for adjusting the speed of the point of driving engagement and the resulting frequency of the signal as previously explained, the bracket 31 is provided with a pair of opposed V-notches 40. Screw members 41 are received in V-notches 40 and threaded into bosses 30. The shank portion of each screw member 41 is provided with a tapering surface 42 so directed that upon engagement with the V-notch 40 when a screw member 41 is rotatively advanced into the boss 30, the bracket 31 tends to be forced away from the screw member 41. If the corresponding opposite screw member 41 is moved outwardly, the tapered surface 42 thereon will permit movement of the bracket 31 in its intended direction.

In my preferred construction I provide the taper 42 with a 45° angle to the axis of the screw member 41 and a companion 45° angle surface 42a along the edges of V-notches 40 so that with a thread pitch of 0.030 inch per revolution I can accurately shift the motor unit 13 relative to the axis 19 of the cradle 18 in an amount of 0.001 inch for each 1/30 turn of screw 41. Furthermore, by marking the circumference of the head of the screw member 41 with graduations 43, and establishing a reference point 44 on the face of the bracket 31 I can thus adjust the axis of driving surface in predetermined micrometer increments.

Thus in the preferred method of adjusting both screws 41 are set up tightly, which condition serves to anchor the motor unit 13 firmly against the bosses 30. When I desire to shift the motor unit a distance of 0.001 inch I slack off 1/30 turn on the screw 41 on the side indicating the direction I desire to move and then set up on the screw 41 from which I wish to advance the motor unit 13. By this method the motor unit is shifted and at the same time fixedly anchored in place. Hence, with this adjustment in combination with the indexing member adjustment, I can very precisely regulate the frequency control of the audible signal desired by the scale graduation.

Although the invention has been described in its preferred form with a certain degree of particularity, it is understood that the present disclosure of the preferred form has been made only by way of example and that numerous changes in the details of construction and the combination and arrangements of parts may be resorted to without departing from the spirit and scope of the invention as hereinafter claimed.

I claim as my invention:

1. In a metronome of the type having a rotating member actuating an audible signal at a frequency proportional to the speed of the rotating member driven by a conical driving surface, the improvement in calibration adjustment, said improvement comprising a case; a generally conical driving surface rotating about its concentric axis depending from the top portion of said case and urged axially to maintain driving engagement with a driven member; said driven member journaled in means mounted on said case to traverse said driven member on said driving surface to vary the speed of said driven member; said driving surface axis supported on means adjustably mounted on said case to move said axis relative to said driven member mounting means to shift the path of driving engagement on said driving surface to adjust the frequency of the signal for a given position of said driven member mounting means.

2. In a metronome of the type having a rotating member actuating an audible signal at a scale indicated frequency proportional to the speed of the rotating member driven by a conical driving surface, the improvement in calibration adjustment, said improvement comprising a case; a generally conical driving surface rotating about its concentric axis depending from the top portion of said case and urged axially to maintain driving engagement with a driven member; said driven member journaled in means mounted on said case to traverse said driven member with a point of driving engagement on a path on said driving surface to vary the speed of said driven member; an index scale on said case having signal frequency indicating graduations corresponding to surface speeds at certain points of driving engagement along said path; said certain points being determined according to the surface speed thereof which will cause the signal frequency to correspond with said indicated frequency graduations; said driving surface axis supported on means adjustably mounted on said case to move said axis relative to said driven member mounting means to shift the loci of said certain points in said path to synchronize the speed at the point of driving engagement with the indicated frequency of said graduations.

3. In a metronome of the type having a rotating member actuating an audible signal at a frequency proportional to the speed of the rotating member driven by a modified conical driving surface, the improvement in calibration adjustment, said improvement comprising a case; a generally conical driving surface rotating about its concentric axis depending from the top portion of said case and urged axially to maintain driving engagement with a driven member; said driven member journaled in mounting means on said case to traverse said driven member with a point of driving engagement on a path on said driving surface to vary the speed of said driven member; an index scale on said case having signal frequency indicating graduations corresponding to surface speeds at certain points of driving engagement along said path; said certain points being determined according to the surface speed thereof which will cause the signal frequency to correspond with said indicated frequency graduations; an indexing member journaled on said case to register with said graduations; connecting means between said indexing member and said driven member mounting means to position the latter for the desired signal; said driving surface axis supported on means adjustably mounted on said case to move said axis relative to said driven member mounting means to shift the loci of said certain points in said path to synchronize the speed at the point of driving engagement with the indicated frequency of said graduations; and said connecting means being provided with adjustable means for moving said indexing member relative to said driven member mounting means to effect precise register with its intended corresponding graduation.

4. In a metronome of the type having a rotating member actuating an audible signal at a frequency proportional to the speed of the rotating member driven by a conical driving surface a case; a motor unit slidably mounted on said case having a rotor with limited axial movement and provided with an external concentric concave driving surface in driving engagement with a driven member under the axial urge of said driving member; a cradle rockably mounted on said case about an axis transverse to said rotor axis; a disc like driven member journaled in said cradle; a scale on said case having graduations designating signal frequency; an indexing member journaled on said case registering with said scale and connected with said cradle for rocking said cradle to traverse said driven member in a path of driving engagement on said driving surface; said graduations spaced from a reference first point fixed on said case to correspond to the surface speed at certain points on said path, said certain points spaced from a reference second point on said path; said motor unit provided with a pair of opposed V-notches engaging said case, a screw member received in each said V-notch and threaded to said case; said screw members having tapered shanks engaging said V-notches respectively to move said motor unit relative to the axis of said cradle as said screw members are respectively rotated whereby said motor unit will be positioned to synchronize said second point with said first point.

5. In a metronome of the type having a rotating member actuating an audible signal at a frequency proportional to the speed of the rotating member driven by a conical driving surface a case; a motor unit slidably mounted on said case having a rotor with limited axial movement and provided with an external concentric concave driving surface in driving engagement with a driven member under the axial urge of said driving member; a cradle rockably mounted on said case about an axis transverse to said rotor axis whereby a driven member is traversed in a path of driving engagement on said driving surface; a disc like driven member journal in said cradle; a scale on said case having graduations designating signal frequency; said graduations spaced from a reference first point fixed on said case to correspond to the surface speed at certain points on said path, said certain points spaced from a reference second point on said path; an indexing shaft journaled in said case having an indexing pointer mounted on one end thereof to register respectively with said graduations; a coupling having a first portion comprising a pinion sector rotatable on said shaft and a companion second portion fixedly mounted on said shaft and adjustably engaging said first portion; said cradle having a gear sector in driving engagement with said pinion sector and rotated thereby to position said cradle to correspond to the register of said pointer; said motor unit provided with a pair of opposed V-notches engaging said case; a screw member received in each said V-notch and threaded to said case; said screw members having tapered shanks engaging said V-notches respectively to move said motor unit relative to the axis of said cradle as said screw members are respectively rotated whereby said motor unit will be positioned to synchronize said second point with said first point; and screw means connecting said first and second portions to rotatively move one relatively to the other to adjust the position of said pointer relative to said cradle to precisely register said pointer with the respective graduation corresponding to the position of said cradle.

6. In the device of claim 5, said motor unit provided with a reference mark adjacent each said V-notch, and each of said screw members having a concentric graduated scale thereon to register with said reference mark for respectively indexing the rotation of said screw members.

References Cited by the Examiner
UNITED STATES PATENTS
2,037,356  4/1936  Von Shuetz _____ 74—198 X DAVID J. WILLIAMOWSKY, *Primary Examiner.*

L. H. GERIN, *Assistant Examiner.*